United States Patent
Jindra et al.

(10) Patent No.: US 10,346,552 B2
(45) Date of Patent: Jul. 9, 2019

(54) CONCIERGE SERVICE SYSTEM AND METHOD

(71) Applicants: Lawrence F. Jindra, Floral Park, NY (US); Joseph F. Dolezal, Old Westbury, NY (US)

(72) Inventors: Lawrence F. Jindra, Floral Park, NY (US); Joseph F. Dolezal, Old Westbury, NY (US)

(*) Notice: Subject to any disclaimer, the term of this patent is extended or adjusted under 35 U.S.C. 154(b) by 47 days.

(21) Appl. No.: 15/214,244

(22) Filed: Jul. 19, 2016

(65) Prior Publication Data
US 2016/0328478 A1 Nov. 10, 2016

Related U.S. Application Data

(63) Continuation-in-part of application No. 13/986,480, filed on May 7, 2013, now abandoned.

(60) Provisional application No. 61/688,098, filed on May 8, 2012.

(51) Int. Cl.
G06F 17/30 (2006.01)
G06Q 30/02 (2012.01)
G06Q 30/06 (2012.01)

(52) U.S. Cl.
CPC .... *G06F 17/30864* (2013.01); *G06F 17/3089* (2013.01); *G06F 17/30991* (2013.01); *G06Q 30/02* (2013.01); *G06Q 30/06* (2013.01)

(58) Field of Classification Search
None
See application file for complete search history.

(56) References Cited

U.S. PATENT DOCUMENTS

| | | | |
|---|---|---|---|
| 9,208,517 B1* | 12/2015 | Boggie | G06Q 30/0277 |
| 2008/0120157 A1* | 5/2008 | Foster | A63B 57/00 705/5 |
| 2009/0254382 A1* | 10/2009 | Weeks | G06Q 10/02 705/5 |
| 2010/0211427 A1* | 8/2010 | Morelli | G06Q 10/02 705/5 |
| 2011/0202376 A1* | 8/2011 | Rodenberg | G06Q 10/02 705/5 |
| 2011/0307392 A1* | 12/2011 | Jenson | G06Q 10/02 705/304 |
| 2012/0296456 A1* | 11/2012 | Jentz | G06Q 10/0639 700/93 |
| 2014/0108068 A1* | 4/2014 | Williams | G06Q 10/02 705/5 |

* cited by examiner

*Primary Examiner* — Debbie M Le
(74) *Attorney, Agent, or Firm* — Douglas Wyatt (57) ABSTRACT

A system and method is provided for conversion of information provided on public and/or private networks and managing that information by categories and offering services relating to that information; and particularly to a system and method for offering services related to maintaining an easy to use consumer site which searches golf courses and provides accurate tee time and other information related to golfing services and collects revenue based on those services.

20 Claims, 5 Drawing Sheets

CONCIERGE SERVICE SYSTEM AND METHOD

PRIORITY

This application is a continuation-in-part and claims priority to co-pending U.S. patent application Ser. No. 13/986,480, filed May 7, 2013, the entire contents of which are all relied upon and fully incorporated herein by reference, which itself claims priority to U.S. Provisional Application Ser. No. 61/688,098, filed May 8, 2012.

BACKGROUND OF THE INVENTION

This invention relates to a system and method for conversion of information provided on public networks and managing that information by categories, and offering services relating to that information, and particularly to a system and method for offering an easy to use consumer site which searches golf courses and provides accurate tee time and other information related to golfing services.

There is an unmet consumer demand for an easy to use consumer site which can be adapted for different goods and/or services. For example there is an unmet need for an easy to use consumer site that searches golf courses to make golf reservations using a number of preferences such as location and provides easy to use, accurate tee time information, while also providing access to charity golf events which may not be readily accessible to the general public.

SUMMARY OF THE INVENTION

The present invention provides a system and method wherein a user is enabled to log onto a web site having an interactive navigation system for searching and selecting tee time and associated golf course information. It can be appreciated that alternative embodiments of the invention can be adapted to include golf related apparel, equipment, and golf accessories. It can also be appreciated that alternative embodiments of the invention can also be adapted for concierge services for other services and goods in other market sectors, such as doctors, lawyers, restaurants, shoes, among other things.

In addition, in an embodiment of the invention, a transaction page can also be provided to enable a user to perform a secure transaction associated with the services on a selected website, such as purchasing a tee time reservation.

A system and method according to the invention can include searching the internet for public information related to golf courses and matching them to a user's requests and specifications. The user is provided with the ability to search by course, by date, by location, by price, among other things. The invention enables the user's selections to be quickly and efficiently matched with corresponding information provided by one or more courses. In addition, the system can permit the venue hosting the course to receive a secure on-line payment from the user.

A system and method according to the invention can also include collecting non-searchable local information related to golf courses in order to supplement the searchable information. Such non-searchable local information may comprise local documents, such as newspapers, magazines, newsletters, golf flyers, services coupons, fliers, handouts, and local mailings, as well as advertisements and/or offers for golf events, tournaments, golf equipment and clothing, and charity events; local oral information, such as information obtained by word of mouth, responses to interviews and questions which may be pertinent to a user, for example, the appropriate tip to give a caddy or whether night golf may be permitted; and local knowledge, such as information that is typically very specific to a region and period of time, for example, weather-related course closures. For example, the user may have specific search criteria, such as whether a certain color of attire is permitted at the golf course. This information is often not readily available over the Internet. The additional collection of local information supplements the available information to create a more comprehensive database of information for the user.

In another embodiment, a system and method according to the invention includes providing a service to enable a user with access to and means to participate in charitable outings at private courses, which may not be completely open to the public or to non-members of the associated golf course or golf club. In addition to searching the internet for available outings which are hosted at such courses, the system can include an additional layer to enable the system to access private information by including a step of submitting access information, such as a user name and/or password, of an individual or entity with authorization to access the private information. The user is provided with the ability to search both the public and private information by course, by date, by location, by price, among other things. The invention enables the user's selections to be quickly and efficiently matched with corresponding information provided by one or more courses. In addition, the system can permit the venue hosting the course to receive a secure on-line payment from the user which may include a payment to a charity.

This model benefits the consumer, the charity, as well as the golf courses, all in a lock-on step fashion, driven by ease-of-use and high consumer satisfactions for the user. In addition to providing access to otherwise unfound donations, the system provides for increased profits to golf courses along with increased capacity utilization, and reduced advertising costs for the golf courses. In addition to providing access to unfound donations to the charity, the invention provides for a broadening of both the scope and breadth of the charity's outreach.

In addition, the invention can include a payment system wherein one or more of the user, the golf course, and/or the charitable organizations (such as a golf outing organizers) is charged either a usage fee associated with registering for the services provided by a system according to the invention or a transaction fee based upon a completed transaction with the golf course or charity. In addition, the invention can include the capture of user information and preferences, as well as targeted advertising for one or more services chosen based upon one or more of the preferences chosen by a user. The system can include tracking of transactions consummated by a user for use with charging targeted advertising. For example, in one embodiment, the service can charge a brokerage fee to the user, a subscription fee from the courses, and/or generate revenue-based advertising.

Specific examples are included in the following description for purposes of clarity, but various details can be changed within the scope of the present invention.

OBJECTS OF THE INVENTION

An object of the invention is to provide a system and method of searching public and privately available information associated with goods and/or services and to make offerings associated with those goods and/or services available to users and to satisfy an unmet consumer demand for those good and/or services. More specifically, it is an object of the invention to provide a system and method of searching public and privately available information associated with tee times and charity golf outings and to make offerings associated with golfing opportunities available to golfers and golf planning agents.

Another object of the invention is to provide an improved and user-friendly internet navigation and search for user activity, serve as a broker of such activities and services, and to supply a transaction service providing, in real time, such services to the consumer and ensuring the secure delivery of funds to the merchant, supplier, or business. It is a further object of the invention to provide a system which can be supported by providing advertisers with customized demographic user information along with quantified site visit data.

It is a further object of the invention to provide a sleek, interactive, and easy-to-use consumer web page and mobile device (i.e., phone or tablet) application for providing access to goods and/or services which may not be readily available to the public.

Another object of the invention is to provide a seamless and transparent behind-the-scenes internet navigation and web search, which includes a secure, interactive, and consumer-friendly transaction page, and which can scale up in breadth and depth for one or more services and/or goods. Another object of the invention is to provide such system which can be further scaled geographically, from local venues to other national venues and on to international venues. Another object of the invention is to provide such system which can be further scaled horizontally across products and/or services, from products and services that are related by type, to products and services related by geography, and/or from products and services that are related by type, to products and services related by relative pricing categories, among other things.

Other and further objects of the invention will become apparent with an understanding of the following detailed description of the invention or upon employment of the invention.

BRIEF DESCRIPTION OF THE DRAWINGS

A preferred embodiment of the invention has been chosen for detailed description to enable those having ordinary skill in the art to which the invention appertains to readily understand how to construct and use the invention and is shown in the accompanying drawing in which.

DETAILED DESCRIPTION

Figure 1:
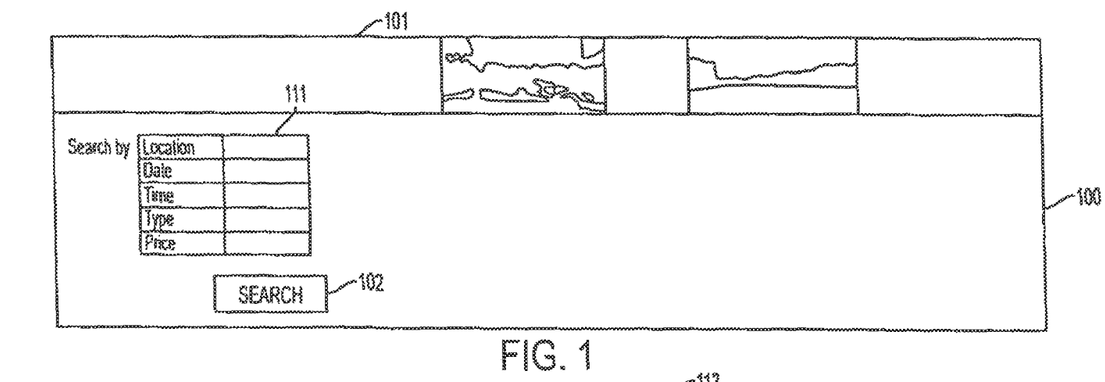
FIG. 1 is a diagram representing one or more search pages provided by an embodiment a concierge service system and method according to the invention.

Referring to the drawing of FIG. 1, a concierge service system and method 100 according to the present invention is directed to a preferred embodiment which includes programming to provide an interface 101 that is provided for selection of one or more categories of search criteria 110 associated with a particular good or service. For example, the interface 101 can include a home page. In the preferred embodiment, the categories of search criteria 110 are associated with certain public and private golf courses and golf outings. The categories of search criteria 110 are selected through one or more processes described more fully within.

In one embodiment, the system and method 100 also includes programming to permit a user to enter one or more search criteria 111 appropriate for a category of search criteria 110. In addition, or in the alternative, the system can present one or more pre-determined search criteria 111 which are predetermined by the system as being appropriate for each category 110. For example, a customer can search by location, date, time, type of course, and price to play from the homepage. The processes by which the system determines the search criteria 111 that can be selected are described more fully within. For example, a user may select from auto-complete fill-in fields as the user enters information which will allow the system to present the user with the desired information faster, more efficiently, and in a format which will be both more helpful and more useful to the user. Once a user has entered and/or selected one or more search criteria 111, the user can request a search to be performed 102.

In a preferred embodiment, the system and method 100 also includes programming to search according to one or more search criteria provided by a user. In addition or in the alternative, the system may include one or more additional predetermined criteria 112 to perform the search. Predetermined criteria 112 can include criteria based on saved user preferences associated with the user, or saved user preferences of a different user such as a concierge at a hotel who may have a predetermined list of venues with whom the hotel may have a preexisting business relationship, and/or additional predetermined system preferences which have been predetermined by the system to facilitate a search, such as national or local location information to narrow the search to terms a system administrator may deem pertinent to the users of the system. As an example of preexisting business relationships, a user may have knowledge of and or access to seasonal promotions, charity events, and or membership information which is not available to the public. As an example of predetermined system preferences, a system customized for the tri-state area near New York City in the United States may specifically limit its searches to the states of New York, New Jersey, and Connecticut, and/or to municipal and public courses.

Accordingly, in one embodiment customized for searching golf courses, a user will desire to search by location, date, time, type of course, and price to play form the homepage. They may fill in fields as they choose which will allow them to be presented with the desired information faster, more efficiently, and in a format which will be both more helpful and more useful to the user. This is one of the initial steps to start the search and/or internet search and web crawling process. It can be appreciated that a system according to the invention can be adapted for use with goods and/or services other than golf course reservations.

Figure 2A:
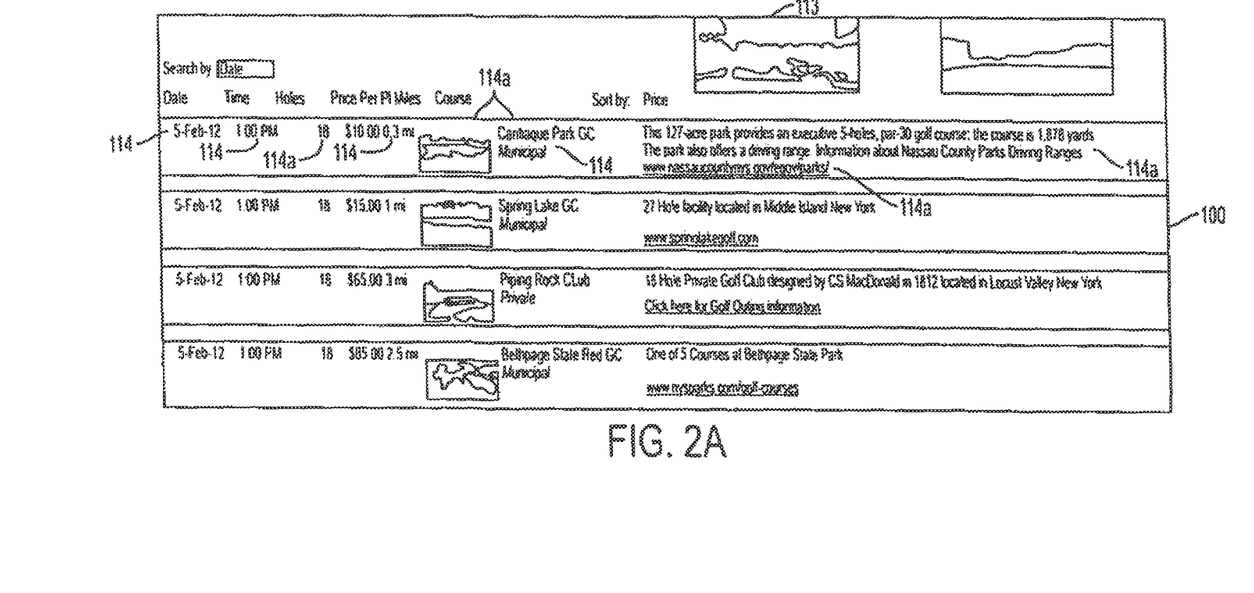
FIGS. 2a, 2b and 2c represent one or more search results pages provided by an embodiment a system and method according to the invention.

Referring to the drawing of FIG. 2a, once a search is performed a preferred embodiment of the system can display and/or send one or more search results 113. The search results can include one or more fields of search information 114 related to the search criteria 111 and/or predetermined search criteria 112. The search information can include other information associated with the search not specified in the search criteria. For example, in addition to search criteria such as "location," "date," "time," "type," and "Price," additional information 114a such as an image, a hyperlink, and/or textual description can also be included. In addition, the system can generate other information from other sources which may or may not be not specifically provided by the target of the search, such as driving directions to the golf course, course data, local information e.g., pro shop contact information, outing prices, such as for comparison purposes, and/or outing availability (on hard to access courses) which are open to the public via outings, golf course links, and/or catering links for golf outings, weddings, parties, and/or fund-raisers.

Figure 2B:
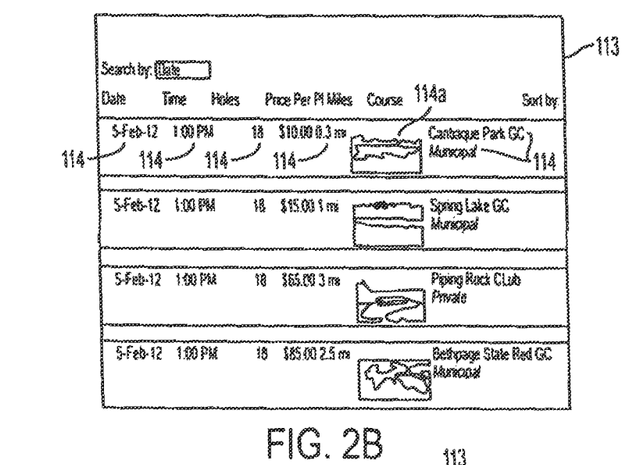
Figure 2C:
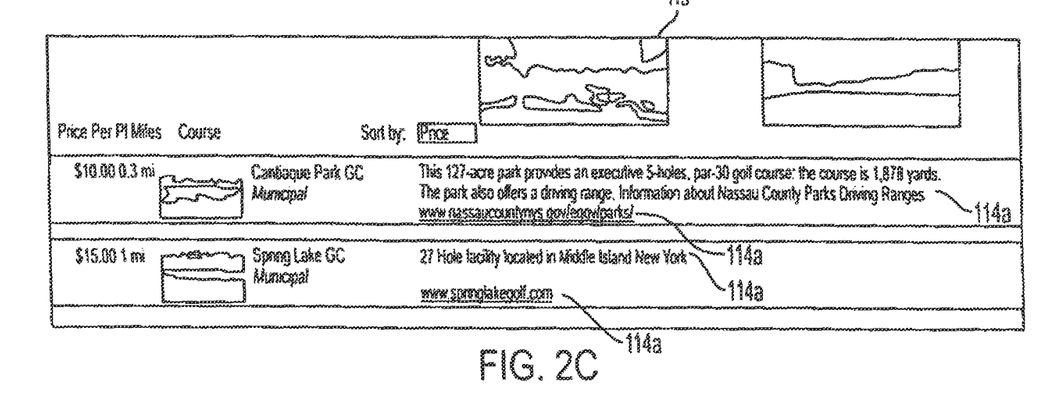

As shown in FIGS. 2b and 2c, if the initial search is for a particular date, such as for Feb. 2, 2012, a list will be presented showing available golf tee times of that day. In an embodiment of the invention customized for golf courses, the system includes programming to permit a user to fine-tune their search. As another example, an embodiment of a system according to the invention can include programming to perform further searches and sorting, such as by price, in order to find the result (in this case golf course) that better matches the user's needs. The results list can be sorted again, by providing programming which enables the user to further select and/or fill-in fields to narrow the search down in accordance with the user's needs.

In an alternative embodiment of a system and method according to the invention, programming can also be provided to perform an initial search according to one or more sets of predetermined criteria. In one embodiment of the invention a plurality of criteria sets can be provided related to a category of goods or services. For example, in an embodiment of the invention adapted for golf services, one predetermined criteria set can include generally unavailable, unpublished and difficult to search golf outings in a specific geographic and/or municipal area such as Nassau county in New York. Therein, either web crawling and/or one or more internet searching algorithms can be used to search among civic, fraternal and/or service clubs.

An embodiment of a system and method according to the invention includes programming to store the search criteria, any predetermined criteria set, and any user input criteria. In addition, programming is provided to store search results associated with the criteria in a database. Programming can also be provided to build a unique profile associated with the user and search criteria associated with the user.

In addition, the system can include programming to save the search results in a separate database for access in future searches which can be used to optimize the search process, to more uniquely and more specifically meet each user's needs or the perceived needs of like users.

In a further embodiment of a system and method according to the invention, programming is provided to perform one or periodic update searches based on one or more search criteria, predetermined criteria sets and or saved user criteria.

An embodiment of a system according to the invention adapted for searching golf courses can include programming to perform at least the following: programming to permit a user to separate and search private or public courses; programming to permit a user to find available tee times and make reservations; programming to permit a user to determine the location of and directions to one or more golf courses; programming to permit a user to receive prices for a round of golf within the customer's budget; programming to permit a user to received either brief or verbose descriptive information about one or more selected golf courses; programming to permit a user to display helpful contact information phone numbers and website links; programming to permit a user to receive photos and/or images of selected golf courses along with course maps, yardage books and a score card; programming to permit a user to find outing costs with links to sponsoring charity websites; programming to permit a user to find course architects and designers, among other things.

Accordingly, a system according to the invention can permit a user to visit, browse, and use the system to find information currently already available on the internet and/or stored on the system. Although the search results may only contain partial content of available information, by presenting the information in a partial content the system presents the information in one user friendly and easy to use website. An embodiment of a system according to the invention can permit a user to use the system as a tool to navigate through golf course information, to save valuable personal and computer time, to connect them to data they desire or require, and to provide them with the answers they seek and would otherwise need hours to discover, to price together and/or to receive.

A system according to the invention can incorporate a mapping feature. The mapping feature is displayed to the user or subscriber along with the search results as shown in FIGS. 2a, 2b and 2c. The feature can include information based on a user's predetermined search criteria 112 such as the type of golf course the user wants to play golf on, whether the golf course matches a membership the user has, and the distance the user is willing to travel to the course. The search results can be categorized with different colored markers according to distance scale. A green marker indicates the closest match to the list parameters, a yellow marker indicates a middle scale, and a red marker indicates the farthest distance from the list parameters. The markers can be incorporated using software in the server programming 450.

Alternative embodiments of a system according to the invention adapted for searching golf courses can also include programming to provide one or more semi-autonomous configurations or combinations to permit the system and method to perform more or less stand-alone. For example, in one embodiment the of the invention the system includes programming to complete a search maneuver each time it is requested by a user and search criteria entered by a user can be sent by the system to an internet site returned from a search result to provide information associated with the sent criteria. Thereafter, the system can directly link a user to the internet site associated with the golf course selected from the search result. In addition or in an alternative embodiment, the system includes programming to wait for a defined period to ensure confirmation from the target internet site before sending a link to the user. For example, after executing a sub-search on target internet site, the system can include programming to wait for results of the sub-search performed by the target internet site. Similarly, a further embodiment of the system can include programming to permit a user to securely submit payment information to make a reservation at the golf course.

Accordingly, a further embodiment of a system according to the invention includes programming to wait for a period of time, such as either a predetermined period of time, or upon receiving confirmation from the target internet site to which the payment has been submitted before informing the user and/or billing the user for use of the system.

Alternative embodiments of a system according to the invention adapted for searching golf courses also include programming to save data that has been retrieved from one or more searches by a user which data is saved in a database with information associated with a user, and programming to make all or part of such data available to the user by the system. Accordingly, the system permits a user to access saved information for requesting the tee times, providing directions, dress code information and other pertinent information available to protect against miscommunication of the selected reservation and tee times.

Figure 3:
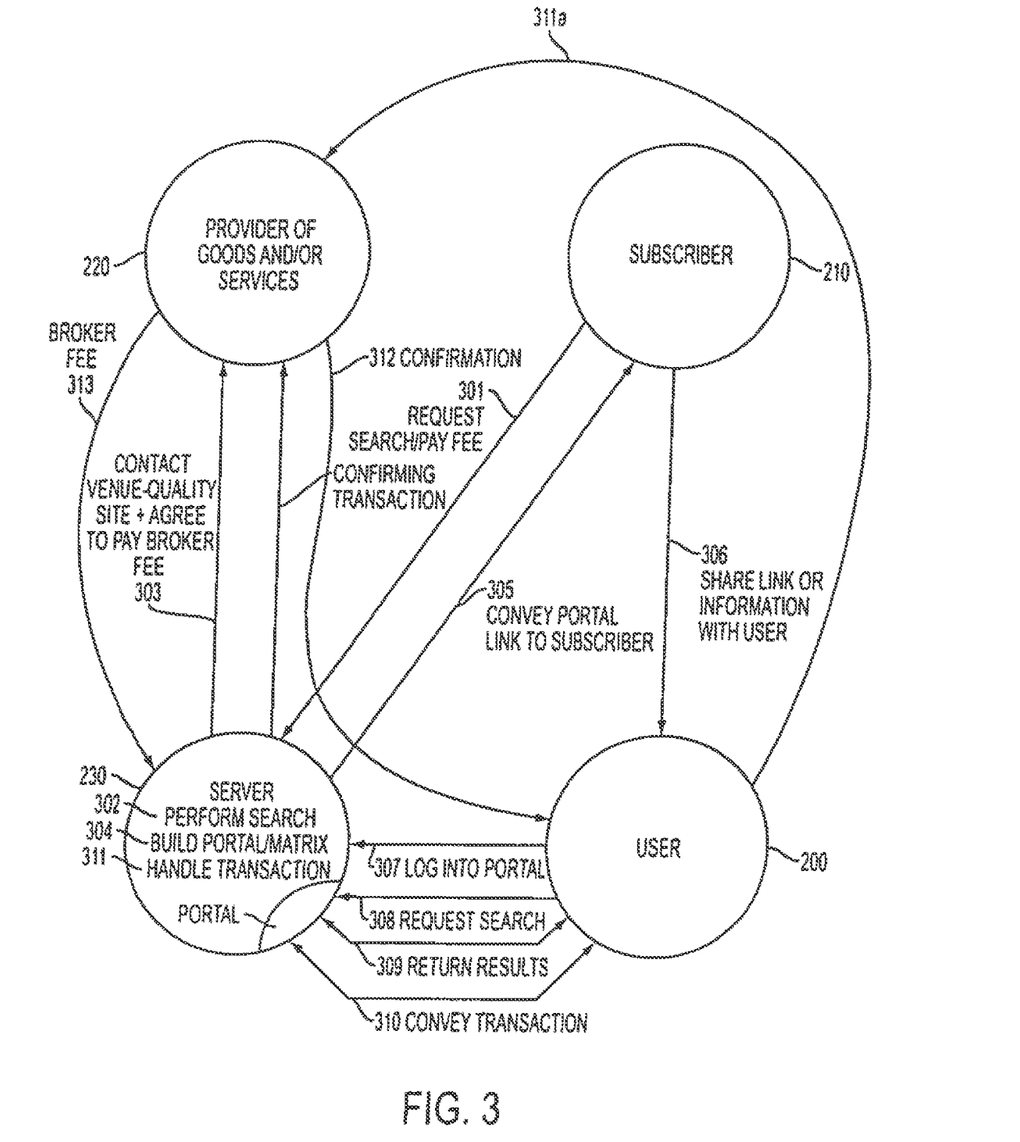
FIG. 3 is a schematic diagram of a modified embodiment of a process for a concierge service system according to the invention.

FIG. 3 shows an alternative embodiment of a method and system according to the invention having one or more steps or processes that can be included in or as one or more of the above-described systems and methods. It can be appreciated that one or more of the steps can be performed in an order other than the order or sequence as described herein. In FIG. 3, lines of communication are shown linking a user 200, subscriber 210, provider of goods and/or services 220, and a concierge server 230 for a concierge service system according to the invention.

In a first step 301, a user 200 or subscriber 210 requests a search. In the case of a user, the user may request the search directly from either the server 230 or a subscriber 210.

In one embodiment of the invention, programming is provided so that in the event a subscriber 210 requests a search from the server 230, the server 230 determines whether or not the subscriber 210 has subscribed to receive services from the server 230. In addition, programming can be provided for the server to securely accept payment from the subscriber for use of one or more of the services provided by the server 230. For example, a vacation resort can subscribe to a service which locates golf outings, destinations and golf packages in an area relevant to the vacation resort and provides that information to the vacation resort for a per use, periodic or other subscription fee.

In a further or second step 302, the server 230 performs a search according to one or more criteria associated with the subscriber 210 or user 200. The server 230 includes programming to save the results of the search which include one or more providers of goods and/or services 220.

In one alternative embodiment of the invention, the server 230 includes programming and/or performs a third or additional step 303 of contacting a provider of the goods or services to determine whether the provider 220 is qualified and/or meets the criteria desired by the server 230 and/or determines whether or not the provider agrees to pay a fee for the server 230 to direct potential customers of the provider 220 to the provider 220.

In another or fourth step 304, the server 230 saves the information associated with the provider in a database and/or matrix. In addition or in the alternative, the server 230 builds a portal through which a user can access the provider's goods and/or services by communication first directly through the server. In a further or fifth step 305, the server 230 communicates a portal link or information associated with the provider's goods and/or services to the subscriber 210 and/or user 200. In an embodiment of the subscriber receiving the information, the subscriber can additionally communicate the link and or provider information to a user 200 in a further or sixth step 306.

In a further or seventh step 307 according to the invention, a user 200 is enabled to log into the server 230 such as by using a link and upon logging in the user can access a search request and/or search result information. In a further step, the server 230 can perform a new search or retrieve saved search information to the user 309. Upon receiving the search information from the server 230, in a further step 310 a user 200 can convey transaction information associated with the search. For example, a user can provide to the server 230 information to make a golf tee time reservation and/or purchase golf shoes.

Upon receiving the user's transaction information, the server can handle the transaction between the provider 220 and the user 200. In an alternative step 311a according to an embodiment of the invention, the transaction is handled between the user and the provider. Upon consummation of the transaction by the provider 220, confirmation information can be sent to the user 312.

In an additional optional step 313, the server 230 can request and/or receive a fee from the provider 220 which fee is associated with the transaction consummated between the user 200 and the provider 200.

Figure 4:
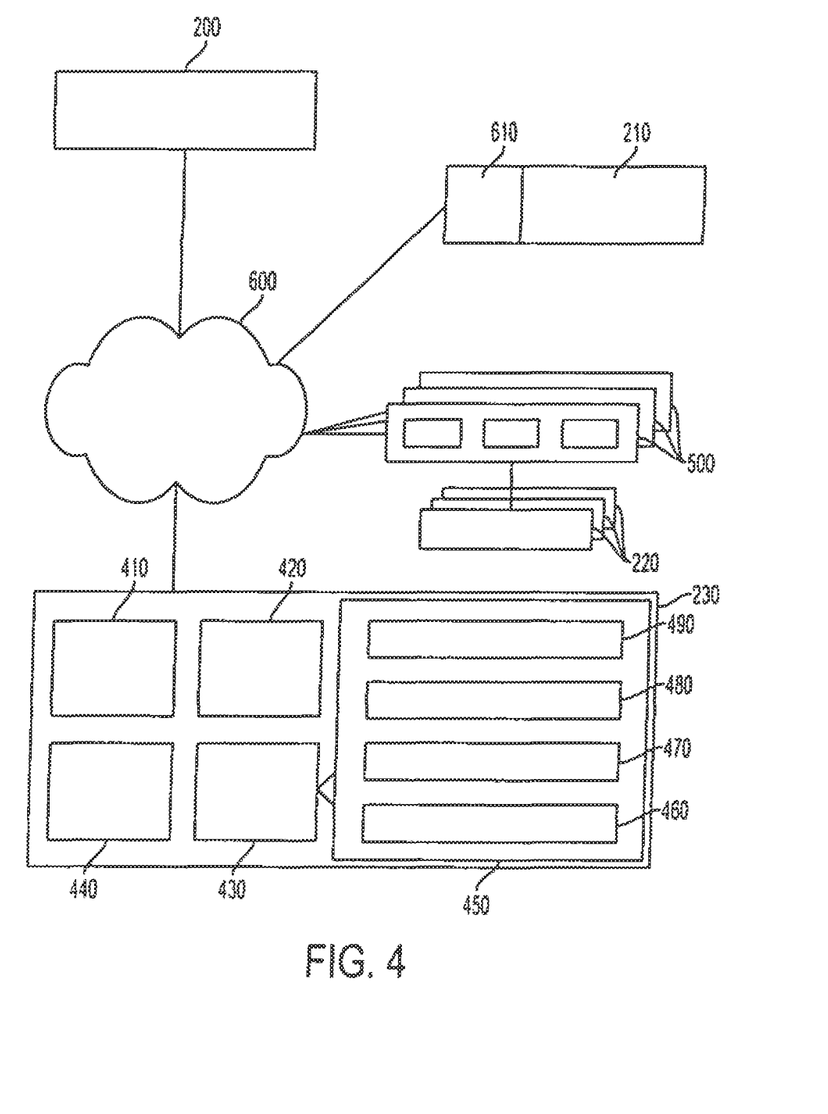
FIG. 4 is a schematic diagram of a concierge service system according to the invention.

FIG. 4 illustrates a schematic view of a concierge service system according to the invention in which a server 230 is in communication with a communications network 600, such as the Internet, to which are also communicatively connected one or more users 200, one or more subscribers 210, and one or more providers 200 each having an associated website 500 which may be a target of one or more searches of the system.

The system comprises a server 230 having a processor 410, a communications port 420 such as an internet modem, memory 430 and at least one user command interface 440, such as a touch screen, mouse and/or keyboard. In addition, the server 230 includes server programming 450 for performing one or more of the steps and for functions described above with respect to FIGS. 1-3, which can include including programming for network communications, database management, a user interface, server home page, server search page, subscriber portal internet page, and provider portal internet page among other things.

Specifically, the programming includes one or more databases or matrices 460 for storage of criteria, search results, and/or user and subscriber information. In addition, or in the alternative, one or more databases 460 can be provided for storage of subscription fee information for managing payments by a subscriber 210 for use by the server. In addition, or in the alternative, one or more databases 460 can be provided for storage of referral and/or broker fee information for managing payments by users 200 and/or providers 220 for consummated transactions.

In addition, the server programming 450 includes programming for one or more search engine programming 470 which search engine programming 470 can be either a stand-alone search engine or alternatively be programming to effect a search through a third party search engine which is not part of the system. The search engine programming includes programming to affect the above described functions related to the searches described above with respect to FIGS. 1-3, including use of user criteria, predetermined criteria, and subscriber criteria among other things.

Furthermore, the server programming 450 includes programming for one or more portals 480 which portals 480 can be include a link to an third party website, such as a provider website 500 associated with a provider 220 and/or programming to emulate portions of a provider website 500 related to the transaction details pertinent to the search. For example, instead of providing all the information that may be available on a provider website 500, select information such as search information 114 associated with a provider 220 can be programmed for display as shown in FIGS. 1-2.

In an alternative embodiment of the invention, the server programming 450 can include programming for a portal builder 490 for providing at least a semi-automated retrieval of criteria information and search results from third party websites, such as a provider website 500 associated with a provider 220. The portal builder 490 includes one or more keywords associated with at least one criteria, which keywords are used for searching within the hypertext markup language of a search target website 500 associated with a provider 220. When there is a match of a keyword for a criteria with a form field on the target website 500 associated with the keyword, the portal builder 490 can store a link associated with that form field. For example in an embodiment customized for golf services, as shown in FIGS. 1-2, a tee time can be entered by a user into a tee-time search field on a search page of a portal maintained by the system. When the tee time is entered, the system can query the target website 500 of a provider 220 by inserting the tee time information into the form field stored by the portal builder 490.

In an alternative embodiment of a system according to the invention, the system can include client programming 610 which can be provided to a subscriber 220 of the services provided by the system. The client programming 610 can include programming to perform one or more of the above-described functions of the programming of the server 230. Among other things, the client programming 610 can include a programming for a subscriber portal customized for the goods and/or services desired by a subscriber 210. For example, a subscriber 210 may be a resort which desired a simplified portal for its guests or users 200 to access one or more goods and/or services associated with the resort, including golf, tennis, restaurants and shopping. Accordingly, the client programming 610 can include programming for separate portals tailored for searching criteria relevant for golf, tennis, restaurants and shopping.

Many golf websites are not readily searchable because they are not optimized for the Internet and have additional information on their sites, for instance, information saved in non-searchable documents. In addition, golf is a sport for which useful information is often distributed locally through people with knowledge of golfing in particular areas, and passed by word of mouth. This makes it difficult to retrieve relevant golfing information on an ongoing basis.

In the present invention, a concierge system and method 100 to collect, organize and present this information to users 200 or subscribers 210, a useful aspect is that it minimizes the amount of time and difficulty it takes a user 200 or subscriber 210 to compile the relevant information on his/her own.

In a further embodiment of the invention, the concierge system is intended to provide an alternative to a human concierge system having local knowledge and provides a method for finding difficult to find, local information, saving it on a server 230 and allowing users 200 or subscribers 210 to access this information in order to reserve or purchase goods or services from providers 220.

Accordingly, a further aspect of the invention includes several steps to supplement generally accessible/searchable databases.

Figure 5:
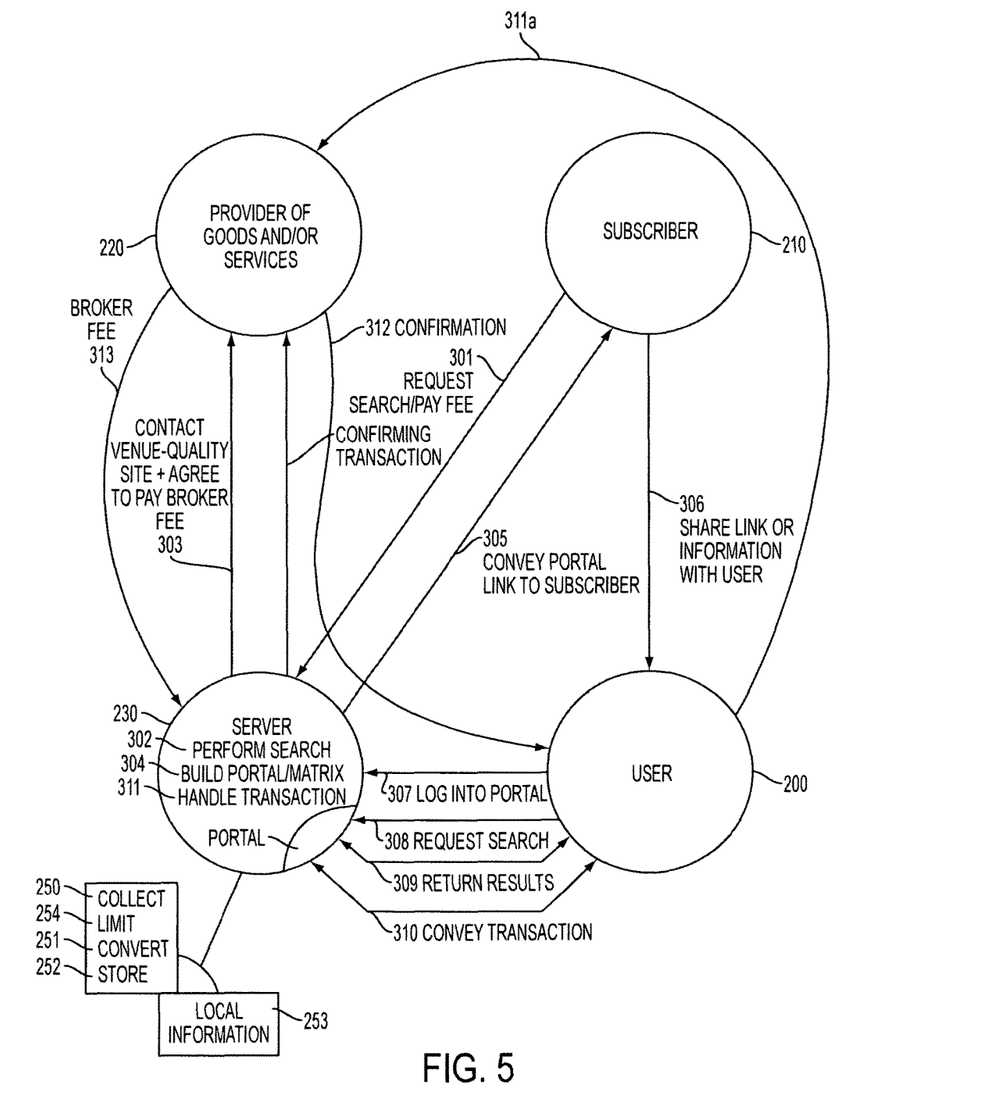
FIG. 5 is a schematic diagram of a modified embodiment of a process for a concierge service system according to the invention.

FIG. 5 displays an alternative process in an embodiment of the invention. The process includes the steps of collecting 250 local information, limiting 254 the information to useful information, converting 251 the local information 253 into searchable information and storing 252 the searchable information into a searchable database for retrieval at a later time. The concierge system contains programming to collect, limit convert and store the local information.

In a preferred embodiment, the system collects such local information periodically such that the information that is collected is timely. The step of collecting 250 local information 253 includes collecting local documents, local oral information and local knowledge. Local documents include non-converted documents such as newspapers, magazines, newsletters, golf flyers, services coupons, fliers, handouts, and local mailings, as well as advertisements and/or offers for golf events, tournaments, golf equipment and clothing, and charity events.

Local oral information includes much of the same information contained in local documents but obtained by word of mouth. In addition, local oral information includes responses to interviews and questions which may be pertinent to a subscriber. For example, the appropriate tip to give a caddy, or whether night golf may be permitted.

Local knowledge includes much of what may be obtained through local oral information, but also includes information that is typically very specific to a region and period of time. Local knowledge includes weather related information, such as course closures due to flooding, or closed, non-public events.

The step of limiting 254 the information includes paring down the information to information the system thinks will be useful to a future user. The system programming stores information as local non-searchable data fields which the programming fills in with the local information it collects and which potential users may need. For example, such fields include information about golfing dates, times, prices and proper attire at different courses. In this way, the system limits the world of information that is useful for its users. There may also be an option in the system for a user to input an additional need and type in what the user is looking for.

Of course, since the information is limited, it is possible that when a user accesses the site the information the user needs will not be available. In so, the system includes programming to update a database and create a new field for the requested information. The service will respond to the user's request by collecting new information from local knowledge, converting the information and then storing it on its server. In this way, the system collects, limits, converts and stores information on a periodic basis based on actual user needs. The concierge system knows to look for this information in the future and add it to the local knowledge database.

The step of converting 251 said local information into searchable information includes: scanning local documents onto the server 230. For example, the documents can be scanned into a digital medium such as a pdf format document. Thereafter, technology such as optical character recognition can be used to convert 251 the documents into a searchable form.

The step of storing 252 the searchable information includes storing the information on a server 230. The step of storing can include ascribing categories for fields for the information contained in the documents for inclusion into a searchable database.

In addition, the step of storing includes a user providing specific information, such as local oral information and local knowledge directly into the database.

Thus, all of the information in this first step is organized and saved onto a database for retrieval at a later time.

In a further embodiment of a method according to the invention, a user 200 or subscriber 210 visits the site and the user or provider creates a profile. The profile contains information such as the location where the user is interested in playing golf, the times the user would like to play, and how much money the user would like to spend, thereby limiting the results the system will retrieve for that user at a later time. Location information is applied as well, to a local expandable scrollable map for easy decision-making on available events in the user's region or one they will be visiting.

Thereafter, the database search is performed comprising data that is already saved on the server 230. The results will be displayed to the user 200 or subscriber 210. The solution features delivery of results via web-based applications as well as iOS and Android apps. Results can include push delivery of relevant options to the user's 200 phone or other smart device, as well as browser.

A system according to the invention can also include intelligent calendar suggestions. In one embodiment, a user can upload their calendar and/or share their calendar with the concierge system. Accordingly, a further embodiment of a method according to the invention compares the user's calendar with days/times for events in the search more intelligently. For example, prefilling dates of the search with the dates/times the subscriber is travelling in the particular region.

Alternatively, eliminating suggestions (e.g. for times they already have appointments during). In addition, consideration of transit times from their location to the golfing location is incorporated into this calculation and can be adjusted by the user. In addition, calendar information can be used to supplement the search for local information where local information can include weather conditions covering the duration of the subscriber's calendared visit.

In addition, or in the alternative, an additional federated internet search can be performed using the collected local information on a search engine such as Google to provide more results. Any additional results will be displayed to the user 200 or subscriber 210 to supplement the search database.

Since the user 200 only receives relevant search results, it limits the amount of time the user 200 needs to spend searching golf information online. The system and method provides the user 200 with access to information that is not readily available through Internet searches. Without this invention, the user 200 or subscriber 210 would need to search through non-searchable documents such as golf sites, pdfs, newspapers and other information to find all available options.

The foregoing merely illustrates the principles of the invention. It will thus be appreciated that those skilled in the art will be able to devise various arrangements which, although not explicitly described or shown herein, embody the principles of the invention and are thus within its spirit and scope. For example, a specified embodiment described herein related to golf can be alternative adapted for or included with other good and or services, such as tennis, restaurants, shoes, among other things.

We claim:

1. A method of conducting a search over a communications network comprising the steps of:
    collecting local information;
    limiting said local information;
    converting said local information into searchable information
    storing said searchable information in at least one stored database;
    receiving a subscription for concierge services from a subscriber;
    receiving at least one predetermined search criteria and at least one subscriber search criteria;
    searching for at least one provider based on at least one of the predetermined search criteria and the subscriber search criteria;
    contacting at least one provider and qualifying said at least one provider;
    storing at least one search result associated with the predetermined search criteria and subscriber search criteria in said at least one stored database, said search result including provider information; and
    communicating portal link information to the subscriber; and wherein said step of contacting at least one provider comprises the steps of visiting at least one website associated with the provider in advance, and collecting provider information for qualifying said provider.

2. The method according to claim 1 further comprising the steps of:
    receiving a login request to the portal link from a user;
    receiving a user search request through the portal link from a user;
    performing a user search based on the search request; said user search being selected from the group comprising a search of the internet and a search of said at least one stored database, said user search returning at least one user search result; and
    communicating said user search result to the user.

3. The method according to claim 2 further comprising the steps of:
    receiving a user transaction request from the user; said user transaction request being associated with the user search result;
    handling the user transaction request with a provider associated with the user search result.

4. The method according to claim 3 further comprising receiving at least one or more new search criteria from the user.

5. The method according to claim 1 further comprising waiting for a predefined period to ensure confirmation from the target internet site before sending a link to the user.

6. The method according to claim 4 further comprising periodically culling said local information from said at least one database.

7. The method according to claim 6 further comprising periodically culling said local information from said at least one database.

8. The method according to claim 6, further comprising collecting new search criteria from a user and expanding said local information to include information sources relevant to said new search criteria.

9. The method according to claim 8 further comprising periodically culling said local information from said at least one database.

10. The method according to claim 3 further comprising at least one of the group of steps consisting of
    receiving a fee from the subscriber associated with the subscription; and
    receiving a fee from the provider associated with the user transaction.

11. The method according to claim 3 further comprising receiving at least one predetermined good or service category from a concierge having at least one preexisting business relationships with at least one of said providers.

12. The method according to claim 10 wherein the predetermined criteria is selected from one of the group comprising: saved user preferences associated with the user;

saved user preferences of a concierge having a preexisting business relationship with at least one provider; and additional predetermined system preferences.

13. The method according to claim 1 further comprising determining whether the provider meets the at least one predetermined search criteria and the at least one subscriber search criteria.

14. The method according to claim 1 further comprising determining whether the provider agrees to pay a fee for the server to direct potential customers of the provider to the provider.

15. The method according to claim 13, further comprising saving the search results in a separate database for access in future searches which can be used to optimize the search process, to more uniquely and more specifically meet each user's needs or the perceived needs of like users.

16. The method according to claim 1 further comprising the steps of providing a map associated with said search results and attributing at least one colored marker associated with is least one search result, wherein said colored marker is associated with a range of match of said search results to at least one criteria.

17. The method according to claim 1, wherein said contacting includes visiting a provider website associated with said provider in advance, and wherein said qualifying step includes testing whether said provider website in an active and live website.

18. The method according to claim 1, wherein said step of collecting local information includes collecting local documents, local oral information and local knowledge.

19. The method according to claim 18, wherein said local documents are selected from the group consisting of non-converted documents such as newspapers, magazines, newsletters, golf flyers, services coupons, fliers, handouts, local mailings, advertisements, offers for golf events, tournaments, golf equipment and clothing, and charity events.

20. The method according to claim 18, wherein said local oral information is selected from the group consisting of responses to interviews and questions of a subscriber; and wherein local knowledge includes is selected from the group consisting of weather, course closures due to flooding, course closures for non-public events.

* * * * *